United States Patent [19]

Skinner et al.

[11] 4,409,196
[45] Oct. 11, 1983

[54] SYNTHESIS GAS FOR AMMONIA PRODUCTION

[75] Inventors: Geoffrey F. Skinner, Maidenhead; Wieslaw M. Kowal, Henley, both of England

[73] Assignee: Foster Wheeler Energy Corporation, Livingston, N.J.

[21] Appl. No.: 231,816

[22] Filed: Feb. 5, 1981

Related U.S. Application Data

[63] Continuation-in-part of Ser. No. 138,625, Apr. 8, 1980, abandoned.

[30] Foreign Application Priority Data

Apr. 24, 1979 [GB] United Kingdom ................ 7914200
Apr. 23, 1980 [GB] United Kingdom ................ 8013446

[51] Int. Cl.³ ............................................. C01C 1/04
[52] U.S. Cl. .................................. 423/359; 252/373; 252/375; 252/376
[58] Field of Search .................. 423/359, 360, 361; 252/373, 375, 376

[56] References Cited

U.S. PATENT DOCUMENTS 2,795,559 6/1957 Whaley .............................. 252/375
3,097,082 6/1963 Guptill .
3,442,613 5/1969 Grotz .................................. 423/354
3,743,699 7/1973 Bogart ................................. 423/359
4,057,510 11/1977 Crouch et al. ..................... 252/375

FOREIGN PATENT DOCUMENTS 768802 6/1970 Belgium ............................. 423/363
993 7/1979 European Pat. Off. .
2825910 1/1980 Fed. Rep. of Germany ...... 252/376

Primary Examiner—O. R. Vertiz
Assistant Examiner—Wayne A. Langel
Attorney, Agent, or Firm—Marvin A. Naigur; John E. Wilson; John J. Herguth, Jr.

[57] ABSTRACT

A process for producing a gas stream for ammonia synthesis in which a gas stream containing hydrogen and nitrogen in excess of ammonia synthesis requirements, e.g. obtained by partial oxidation of natural gas, coal or oil, is treated to remove other component gases and thereafter subjected to a separation stage, e.g. in a cryogenic separator, to separate a hydrogen-nitrogen stream having the desired hydrogen:nitrogen ratio which is injected into the reactor for ammonia synthesis, and a waste nitrogen stream which may be utilized in power generation or washing stages.

11 Claims, 3 Drawing Figures

SYNTHESIS GAS FOR AMMONIA PRODUCTION

CROSS-REFERENCE TO RELATED APPLICATION

This application is a continuation-in-part of co-pending application Ser. No. 138,625, filed Apr. 8, 1980, entitled "Synthesis Gas For Ammonia Production".

This invention relates to a method for producing a gas containing hydrogen and nitrogen which is particularly suitable for use as an ammonia synthesis gas.

Commercial production of hydrogen is frequently carried out by a succession of process steps which essentially comprise:

(i) the production of a gas containing carbonoxides and hydrogen as its principal constituents by reaction of the hydrocarbon feedstock with oxygen and/or air and/or steam, (ii) oxidation of the carbon monoxide with steam to carbon dioxide and hydrogen ('shift conversion'), (iii) removal of carbon dioxide, leaving a substantially pure hydrogen stream, (iv) final purification as appropriate to remove residual impurities.

Two major variants of this process sequence currently in use are:

A. Catalytic Steam Reforming

This process is presently restricted by the availability of suitable catalysts to use with natural gas, naphtha and similar light feedstocks. The catalysts are sulphur-sensitive and accordingly the hydrocarbon must be rigorously desulphurised prior to contact with the catalyst. The desulphurised feedstock is mixed with 2 to 4 moles steam/atom carbon and then passed over the catalyst, leaving at high temperature as a mixture containing chiefly hydrogen, carbon oxides, residual methane and unreacted steam. The heat needed to raise the reactants temperature to the exit temperature and to provide the endothermic heat of reaction is supplied by enclosing the catalyst in tubes which are heated externally in a furnace.

The steam reforming process can alternatively be carried out wholly or partially autothermically, by admission of air and/or oxygen to allow combustion within the catalytic reactor. Specifically in the production of ammonia synthesis gas from natural gas indirect heat supply to the reactants in the primary reformer is supplemented by internal combustion of air in the secondary reformer which supplies inter alia the nitrogen requirement of the ammonia synthesis process. In another steam-reforming process all the high temperature heating necessary is provided by the autothermic combustion of oxygen or oxygen-enriched air in the catalyst zone and there is no indirectly heated reformer at all.

The reformer product gas is subjected to CO shift conversion, $CO_2$ removal and final purification such as methanation in accordance with the requirements of individual applications.

B. Partial Oxidation

The partial oxidation processes are based on the combustion of the hydrocarbon feed in a restricted supply of oxygen or air. Examples include some such as the Texaco and Shell processes that are capable of accepting the full range of hydrocarbons from natural gas to coal and others such as the Koppers-Totzek and Lurgi Processes that are specific to coal.

Since no catalyst is used in these processes, the sulphur content of the feed hydrocarbon is not critical.

The product gases from the partial oxidation processes contain hydrogen, carbon oxides, residual methane and steam in various proportions, with sulphur compounds, chiefly hydrogen sulphide, to the extent that sulphur is present in the feed and other trace impurities. Particularly in the case of the Lurgi and other processes in which coal is maintained in the gasifier at relatively low temperatures, the product gases can contain substantial amounts of high molecular weight organic material such as benzole and tars.

The desirability of freeing the product gas of trace impurities, combined with the difficulty in operating a low temperature (about 200° to 250° C.) carbon monoxide shift catalyst on sulphur-laden gases, has frequently led to the choice of nitrogen wash for final gas purification after shift and carbon dioxide and hydrogen sulphide removal cf. the use of methanation with steam reforming.

It will be recognised that in the application of the partial oxidation processes and of the autothermic steam reforming processes as outlined above, the employment of air as the internal oxidant is restricted by the degree that the resultant nitrogen present is acceptable in the product gas.

Thus in the usual natural gas based ammonia process, the amount of air admitted to the secondary reformer is limited to the supply of nitrogen required for the ammonia synthesis step. Also in the partial oxidation and autothermic reforming operations, recourse to at least partial supply of the oxidant in the form of substantially pure oxygen is usually necessary, except when the process is to be used only to produce a low grade fuel gas. The necessity for the supply of substantially pure oxygen means that an air separation plant must be provided. The additional capital and running costs incurred thereby results in such processes appearing less attractive as a means of producing hydrogen rich gases except when the feed hydrocarbon is very cheap or complete flexibility of feedstock source is desired.

One exception to this restriction is in the Braun "Purifier" Process for the manufacture of ammonia disclosed in U.S. Pat. No. 3,442,613. In the process disclosed a synthesis gas stream is obtained by primary reforming methane or other hydrocarbon with steam followed by a secondary reforming in which air is present in an amount to provide a stoichiometric excess of nitrogen from 2 mole percent to 150 mole percent based upon that needed for the synthesis gas. The excess nitrogen is condensed downstream of the reformer.

It is an object of the present invention to provide a method of producing a gas stream suitable for the synthesis of ammonia.

According to one embodiment of the invention there is provided a process for producing a gas stream for the synthesis of ammonia which comprises partially oxidising oil, coal, natural gas or any combination thereof in the presence of air to produce a gas stream containing hydrogen and nitrogen with a stoichiometric excess of nitrogen of at least 200, generally 230 to 270, mole percent based upon that needed for ammonia synthesis together with carbon oxides, methane and hydrogen sulphide if sulphur was present in the oil, coal or gas, treating the gas stream to remove substanially all of the component gases other than hydrogen and nitrogen, drying the gas stream when water is present, subjecting the gas stream to a separation stage to separate a hydrogen-nitrogen gas stream having a predetermined nitrogen:hydrogen ratio suitable for ammonia synthesis and a nitrogen-rich gas stream, and injecting said hydrogen-nitrogen stream into a reactor for ammonia synthesis.

According to a further embodiment of the invention there is provided a method for producing a gas stream suitable for the synthesis of ammonia comprising providing a gas stream consisting essentially of nitrogen and hydrogen, in which the nitrogen is in excess of 200 mole percent of the quantity required for ammonia synthesis at a pressure of at least 15 bar, generally 30 to 100 bar, subjecting the gas stream to a separation stage in which a portion of the nitrogen is condensed to provide a hydrogen-nitrogen gas stream at a pressure comparable to the pressure prior to the separation stage in which the hydrogen:nitrogen ratio is suitable for ammonia synthesis and a nitrogen stream at a pressure of up to 50 bar, generally to 5 to 10 bar, injecting the hydrogen-nitrogen gas stream into a reactor for ammonia synthesis and heating the nitrogen stream to a temperature up to 2000° C. Generally 500° C. to 1500° C. and expanding it in a turbine to generate power.

The invention is based, in part, on the fact that hydrogen and nitrogen mixtures can be separated with ease in view of the large difference in their properties and hence the nitrogen content of such mixtures may be accurately controlled. The simplest method of separating the gases is by cryogenic treatment although other separation methods which rely on the difference in molecular size of the gases, e.g. differential adsorption methods or diffusivity, may also be used. The invention allows any gas which predominantly contains hydrogen and nitrogen to be used and the source gas may therefore be derived from the partial oxidation of oil, coal or gas in air.

In a preferred embodiment, the desired amount of nitrogen is separated in a cryogenic separator. The separator may use Joule Thomson cooling and regenerative heat exchange, low temperature work expanders, supplementary refrigeration or any combination thereof. Suitable cryogenic separators are well known and commercially available. The separated hydrogen containing the desired quantity of nitrogen normally leaves the cryogenic separator at a slightly lower pressure than its inlet pressure and is injected into a system for ammonia synthesis.

The nitrogen stream normally leaves the cryogenic separator at a somewhat lower pressure than its inlet pressure but nevertheless may still give useful power when heated and passed through an expansion turbine.

The process of the invention has a number of advantages over that disclosed in U.S. Pat. No. 3,442,613. The synthesis gas of the invention may be obtained by partial oxidation, i.e. combustion, of a wide range of hydrocarbons including coal, which is less complex than the catalytic steam reforming route and the sulphur content of the feed hydrocarbon is not critical since no catalyst is used. Combustion may be conducted in a single stage thereby avoiding the use of primary and secondary reformers. Whilst the amount of air used in the combustion stage provides nitrogen in an amount of at least 200 mole percent in excess of the synthesis gas requirements, this large amount of excess nitrogen may be utilized to generate useful power after the separation stage since it is at higher pressure compared with the prior art process thereby contributing to the economics of the entire system.

The invention will now be described with reference to the accompanying drawings, in which.

Figure 1:
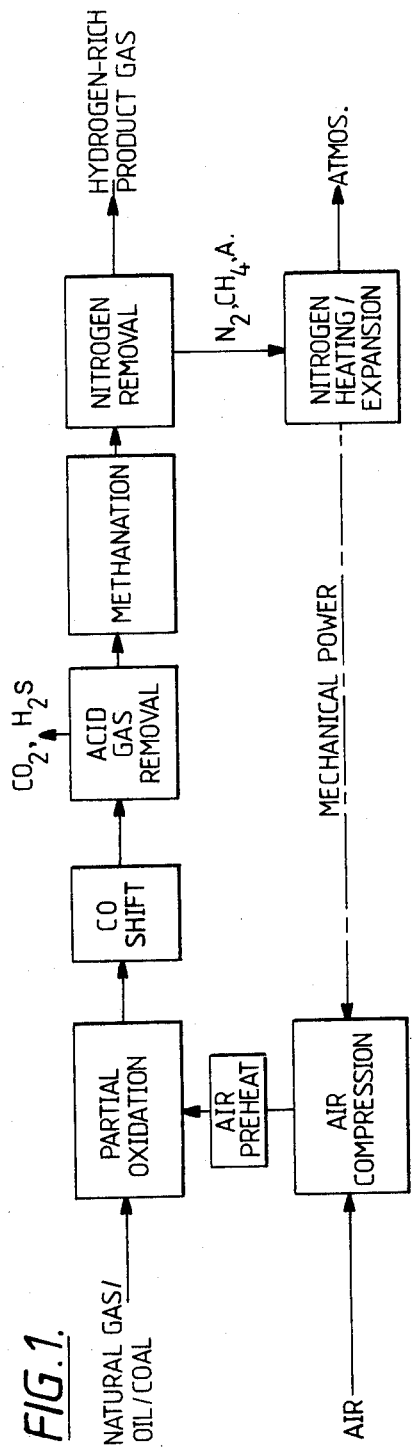
FIG. 1 represents a flow diagram of a process in accordance with the invention.

Referring to FIG. 1, natural gas, oil or coal or a combination thereof is partially oxidised with air or oxygen enriched air which is generally preheated and pressurised. The resulting gas stream contains hydrogen, nitrogen, carbon oxides, methane and hydrogen sulphide if sulphur is present, the nitrogen being in an excess of at least 200 mole percent of that required for ammonia synthesis. The partial oxidation process is conducted at a pressure up to 150 bar generally 15 to 150 bar, preferably 30 to 100 bar and a temperature of 300° to 2000° C. generally up to 1000° C. The oxidation may be conducted at atmospheric pressure in which case the gas stream may be pressurized at a later stage in the treatment process.

The resulting gas stream is passed over a shift catalyst, e.g. iron oxide or cobalt molybdate, generally at a temperature in the range 200° to 500° C. to convert the carbon monoxide present to carbon dioxide and hydrogen. The gas stream is then treated to remove carbon dioxide and hydrogen sulphide impurities. There are many types of process for such gas removal including scrubbing with hot potassium carbonate e.g. at 70° to 110° C. and the Rectisol process. The sulphur content of the gas may be removed at any prior stage. Any residual carbon oxides present may be removed by methanation, generally at 250° to 450° C. The resultant gas comprises a mixture of hydrogen and nitrogen, with methane, inert gases such as argon and water vapour as the chief impurities. This gas is then dried by cooling initially and subsequently by contact with drying medium e.g. molecular sieve adsorbent (which would also remove any remaining traces of carbon dioxide). The dried gas is then passed to a cryogenic nitrogen/hydrogen separator, e.g. which uses Joule Thomson cooling and regenerative heat exchange. The gas is contacted with heat exchange elements which cool the gas to about 100 K. In the cryogenic condenser, the nitrogen content of the dried gas is reduced to the level required for the ammonia synthesis gas, typically 25% $N_2$ for ammonia synthesis. The cryogenic nitrogen condensation will result in partial depletion of the methane and argon content of the inlet gas, the impurities removed appearing in the waste nitrogen stream. The hydrogen-nitrogen stream, which leaves the condenser at a pressure slightly less than the inlet pressure of the gas stream, is injected into an ammonia synthesis system.

Figure 2:
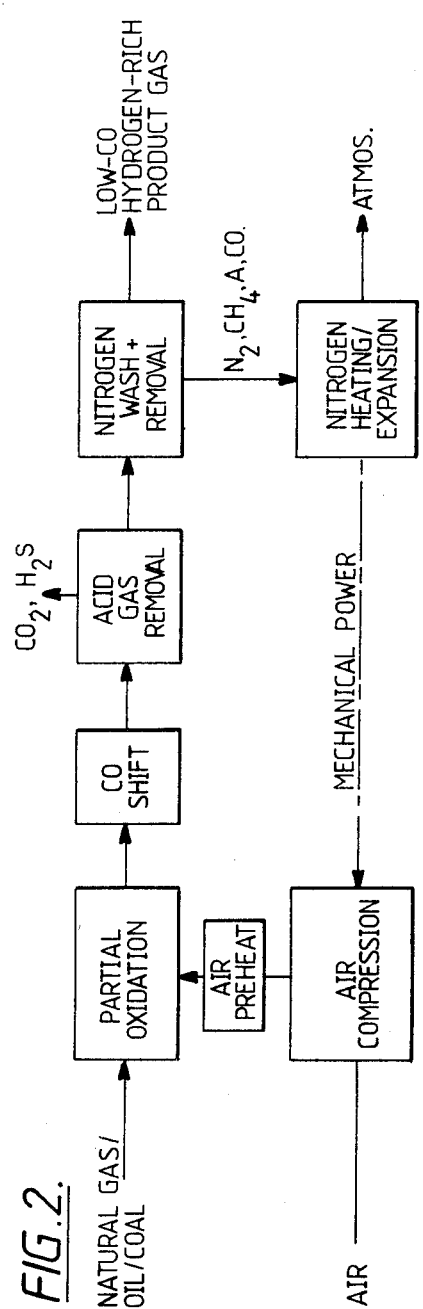
FIG. 2 represents a flow diagram of an alternative process in accordance with the invention.

In the embodiment depicted in FIG. 2, the nitrogen condenser incorporates a form of liquid nitrogen washing to remove residual carbon monoxide to a level acceptable for ammonia synthesis. This expedient enables methanation to be dispensed with and allows the convenient use of a higher CO level from the shift conversion and in resulting in a final synthesis gas substantially free of $CH_4$ and inert gases. The pure nitrogen needed for the washing may conveniently be obtained from the condensed nitrogen in the cryogenic separator, thus there would be no dependence on an external source of liquid nitrogen as in the classical nitrogen wash plants.

It is also possible for the cryogenic nitrogen condensation to be placed upstream of methanation in FIG. 1.

In all applications it is advantageous for the waste nitrogen to be discharged from the cryogenic condenser at near ambient temperature and at an elevated pressure up to 50 bar, generally 5 to 10 bar since it may then be heated to a representative inlet temperature for a high-temperature turbine and expanded therein to near atmospheric pressure, thus generating a useful proportion of the power needed for pressuring the gas stream, e.g. to compress the process air for the partial oxidation step.

The waste nitrogen may be heated to the turbine inlet temperature, e.g. 500° to 2000° C., generally 500° to 1000° C., by indirect heat exchange and/or by direct combustion of its combustible content, i.e. traces of methane, hydrogen, carbon monoxide with supplementary air and additional fuel if required upstream of the turbine.

Figure 3:
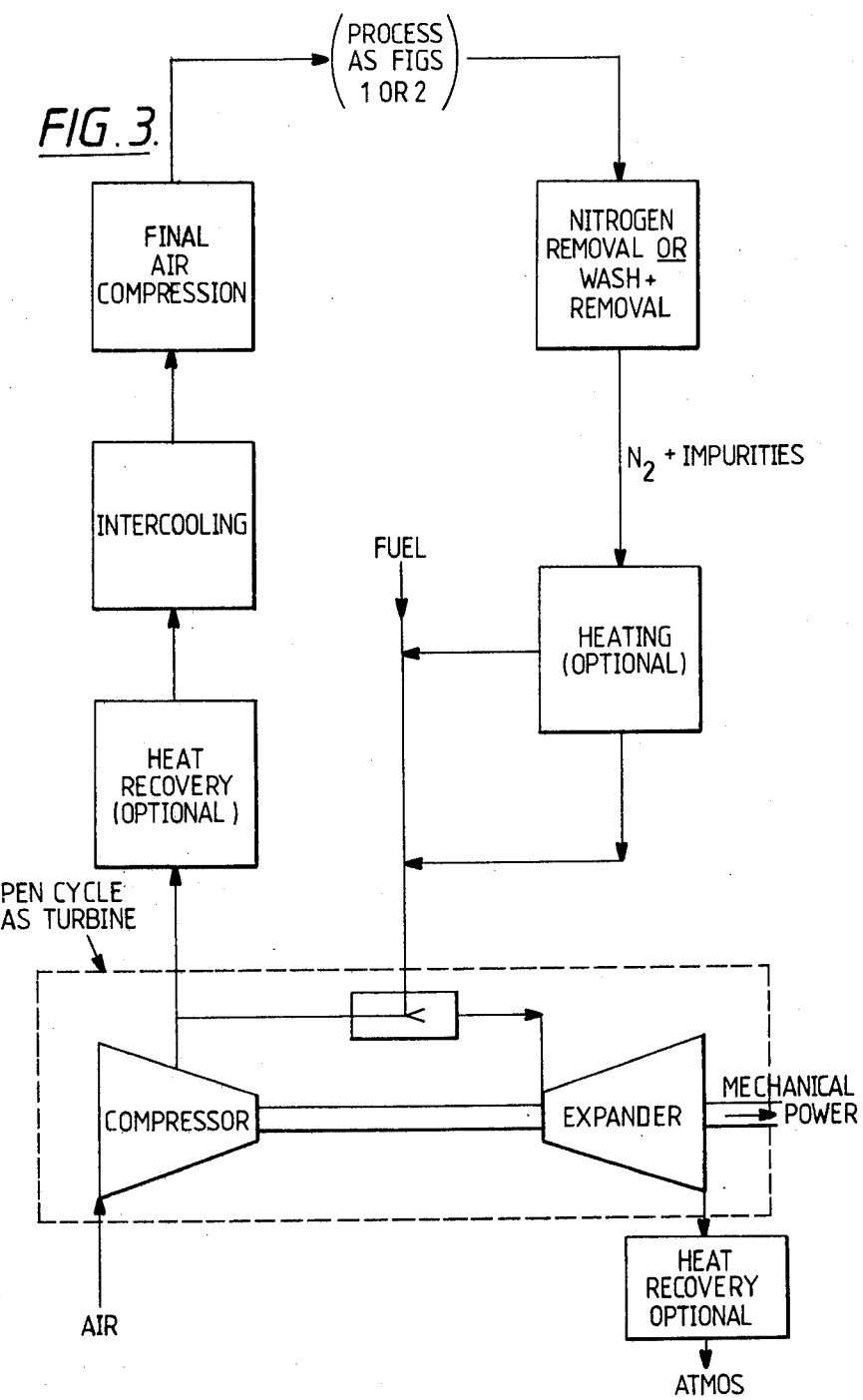
FIG. 3 represents a diagram of a high temperature open cycle gas turbine suitable for use in the process of the invention.

In the arrangement of the expansion turbine shown in FIG. 3 the hot gas expansion turbine is the turbine element of an open cycle gas turbine. The nitrogen is mixed with supplementary fuel and fed to the combustion chamber of the gas turbine as fuel. At the same time the process air requirement for the partial oxidation is bled from the gas turbine compressor discharge. By this expedient approximate parity is maintained between the mass flows in the compressor and expander sections of the gas turbine and an efficient means of compression and expansion provided using developed industrial equipment designs.

Alternatively the waste nitrogen may be expanded at a low temperature, e.g. ambient temperature to generate power and may be used for refrigeration of desirable parts of the ammonia synthesis plant.

If the waste carbon dioxide from the acid gas removal plant may be discharged to the atmosphere in impure form it is expedient to use the waste nitrogen under pressure from the cryogenic separator to strip a substantial part of the carbon dioxide from the wash solution and then to pass the combined nitrogen and carbon dioxide stream still at high pressure to heating and work expansion.

In summary, the following advantages are offered for the air oxidation/nitrogen condensation/nitrogen expansion system described over current practice involving oxidation of feedstock:

1. elimination of air separation plant, oxygen compressors, pipework, etc.
2. reduction in gross installed power of plant compressors can be achieved in many cases,
3. taking into account the high potential efficiency of the waste nitrogen containing gas expansion and conventional associated heat recovery,
4. a substantial reduction in the total energy requirement for the whole plant.

The pressures referred to herein are gauge pressures.

What we claim is:

1. A process for producing a feed gas stream for the synthesis of ammonia which comprises:
   (a) partially oxidising a substance selected from the group consisting of oil, coal, natural gas or any combination thereof in the presence of air at a pressure of 15 to 150 bar and at a temperature of 300° to 2000° C. to produce a raw gas stream containing hydrogen and nitrogen with a stoichiometric excess of nitrogen of at least 200 mole percent based upon that needed for ammonia synthesis, together with carbon oxides, methane and hydrogen sulphide if sulphur was present in the oil, coal or gas,
   (b) treating the raw gas stream from step (a) to remove substantially all component gases other than hydrogen and nitrogen,
   (c) drying the raw gas stream from step (b) if water is present,
   (d) subjecting the raw gas stream from step (c) at a pressure of 15 to 100 bar to a separation stage to separate (1) a hydrogen-nitrogen feed gas stream at a pressure of 15 to 100 bar, said feed gas stream having a predetermined nitrogen:hydrogen ratio suitable for ammonia synthesis, and (2) a nitrogen-rich gas stream at a pressure of 5 to 50 bar,
   (e) injecting said hydrogen-nitrogen feed gas stream from step (d) into a reactor for ammonia synthesis,
   (f) heating said nitrogen-rich gas stream from step (d), still at a pressure of 5 to 50 bar, to a temperature of 500° to 2000° C., and
   (g) expanding said high pressure nitrogen-rich gas stream from step (f) in a turbine to generate power.

2. A process according to claim 1 wherein the separation stage in step (d) is performed in a cryogenic separator.

3. A process according to claim 2 wherein said raw gas stream resulting from the partial oxidation is passed over a shift catalyst and reacted with steam at elevated temperature to convert the carbon monoxide present in said raw gas stream to carbon dioxide and hydrogen.

4. A process according to claim 3 wherein said raw gas stream, after passing over the shift catalyst, is subjected to scrubbing with hot potassium carbonate at a temperature of 70 to 110 degrees C. to remove the acid gas content prior to the separation stage.

5. A process according to claim 4 wherein said raw gas stream, after scrubbing with hot potassium carbonate, is subjected to liquid nitrogen washing to remove carbon monoxide in said raw gas stream prior to the separation stage.

6. A process according to claim 5 wherein the separation stage is conducted in a cryogenic separator and the liquid nitrogen in the washing step is obtained from the nitrogen condensed in the cryogenic separator.

7. A process according to claim 4 wherein said raw gas stream after scrubbing with hot potassium carbonate is subjected to methanation to remove any carbon oxides prior to the separation stage.

8. A process according to claim 1 wherein said nitrogen-rich stream is mixed with supplementary fuel and fed to the combustion chamber of a gas turbine as fuel.

9. A process according to claim 8 wherein said process air requirement for the partial oxidation is bled from the gas turbine compressor discharge.

10. A process according to claim 1 wherein said stoichiometric excess of nitrogen is from 230 to 270 mole percent based upon that needed for ammonia synthesis.

11. A process for producing a feed gas stream for the synthesis of ammonia which comprises:
    (a) partially oxidising a substance selected from the group consisting of oil, coal, natural gas, or any combination thereof in the presence of air at a pressure of 15 to 150 bar and at a temperature of 300° to 2000° C. to produce a raw gas stream containing hydrogen and nitrogen with a stoichiometric excess of nitrogen of at least 200 mole percent based upon that needed for ammonia synthesis, together with carbon oxides, methane and hydrogen sulphide if sulphur was present in the oil, coal, or gas;

(b) passing said raw gas stream from step (a) over a shift catalyst and reacting said raw gas stream with steam at elevated temperature to convert the carbonl monoxide present to carbon dioxide and hydrogen;

(c) treating said raw gas stream from step (b) to remove carbon dioxide in a wash solution;

(d) treating the raw gas stream from step (c) to remove substantially all component gases other than hydrogen and nitrogen;

(e) drying the raw gas stream from step (d) if water is present;

(f) subjecting the raw gas stream from step (e) at a pressure of 15 to 100 bar to a cryogenic separation stage to separate (1) a hydrogen-nitrogen feed gas stream at a pressure of 15 to 100 bar, said feed gas stream having a predetermined nitrogen:hydrogen ratio suitable for ammonia synthesis, and (2) a nitrogen-rich gas stream at a pressure of 5 to 50 bar;

(g) injecting said hydrogen-nitrogen feed gas stream from step (f) into a reactor for ammonia synthesis;

(h) using said nitrogen-rich gas stream produced by the cryogenic separator in step (f), still at a pressure of 5 to 50 bar, to strip a substantial part of the carbon dioxide from the wash solution produced in step (c);

(i) heating the combined nitrogen and carbon dioxide stream from step (h), still at a pressure of 5 to 50 bar, to a temperature of 500° to 2000° C.; and, (j) expanding said combined nitrogen and carbon dioxide stream from step (i) in a turbine to generate power.

* * * * *